March 18, 1952  S. KNEITEL  2,589,825
APPARATUS FOR FIXING RELATIVE POSITIONS OF MEMBERS
PHOTOGRAPHED ON MOTION-PICTURE FILM
Filed April 29, 1949  2 SHEETS—SHEET 1
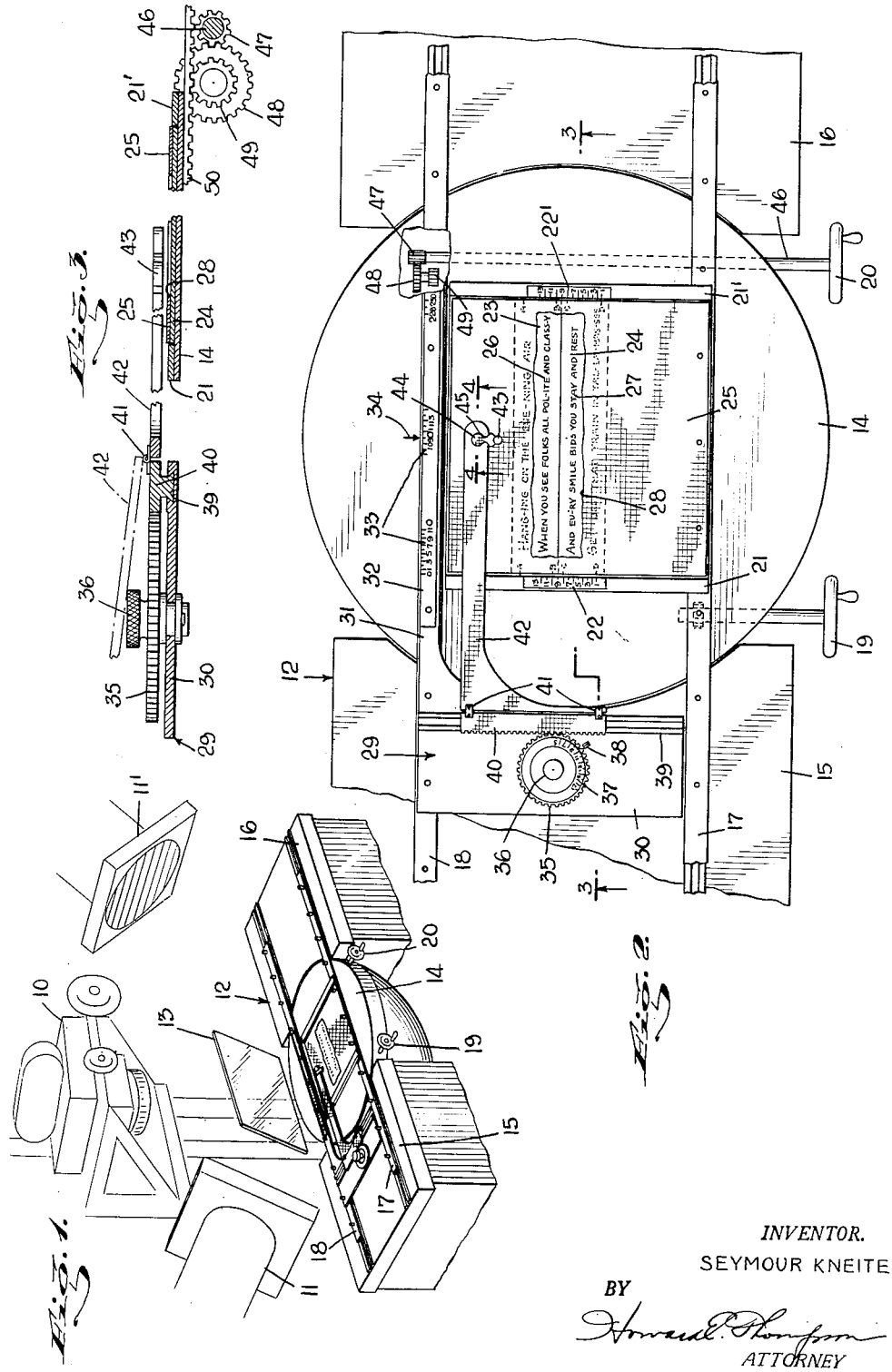
INVENTOR.
SEYMOUR KNEITEL
BY
Howard P. Thompson
ATTORNEY March 18, 1952     S. KNEITEL     2,589,825
APPARATUS FOR FIXING RELATIVE POSITIONS OF MEMBERS
PHOTOGRAPHED ON MOTION-PICTURE FILM
Filed April 29, 1949     2 SHEETS—SHEET 2
*Fig. 4.*     *Fig. 5.*     *Fig. 6.*
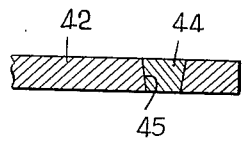
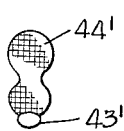
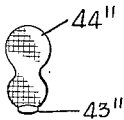
*Fig. 7.*
| MUSIC | | | | ANIMATION | | | | |
| --- | --- | --- | --- | --- | --- | --- | --- | --- |
| MUSIC INSTRUCTIONS | MOUTH ACTIONS | DIAL NO. BEATS | ACTION | ACTION DWGS. Top..........Bottom | | | | CUT-OUTS |
| | | | | BALL | POS. | CARD | POS. | |
| | | 7 | | 6 | | 1+2 | B10 | |
| | | 5 | | | | | | |
| | | 4 | | | | | | |
| | | 3 | | | | | | |
| | | 2 | | | | | | |
| | | 1 | | | | | | |
| | | 1 | | | | | | |
| | | 3 | | | | | | |
| | | 5 | | 107 | | | | |
| | | 7 | | 108 | | | | |
| | | 9 | | 109 | | | | |
| | | 10 | | 110 | | | | |
| | | 7 | | 111 | | | | |
| | | 4 | | 112 | | | | |
| | | 1 | | | | | | |
| | | 1 | | | | | | |
| | | 2 | | | | | | |
| | | 3 | | | | | | |
| | | 4 | | | | | | |
| | | 5 | | | | | | |
| | | 7 | | | | | | |
| | | 9 | | | | | | |
| | | 11 | | | | | | |
| | | 7 | | | | | | |
| | | ETC | | | | | | |
| | | | | 113 | | | | |
| | | | | 114 | | | | |
| | | | | 115 | | | | |
| | | | | 116 | | | | |
| | | | | 117 | | | | |
*Fig. 8.*
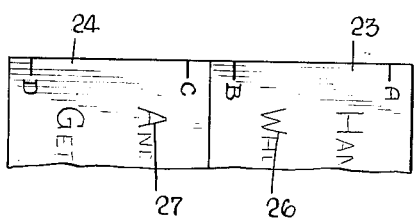
INVENTOR.
SEYMOUR KNEITEL
BY
ATTORNEY Patented Mar. 18, 1952

2,589,825

UNITED STATES PATENT OFFICE 2,589,825

APPARATUS FOR FIXING RELATIVE POSITIONS OF MEMBERS PHOTOGRAPHED ON MOTION-PICTURE FILM

Seymour Kneitel, New York, N. Y., assignor, by mesne assignments, to Paramount Pictures Corporation, a corporation of New York Application April 29, 1949, Serial No. 90,314

4 Claims. (Cl. 88—24)

This invention relates to apparatus employed in conjunction with motion picture cameras, in taking a series of motion picture film so as to regulate and adjust relative positions of two or more members or elements in the successive pictures taken so as to produce on the resulting film length, relative motion between said members or elements in the projection of said film. More particularly, the invention deals with a camera bed having means for adjustably supporting a plurality of song sheets or strips thereon, and means comprising an adjustable and swinging arm and a slide supporting said arm for moving an object on the arm relatively to the script on said song sheets or strips.

The novel features of the invention will be best understood from the following descriptions when taken together with the accompanying drawings, in which certain embodiments of the invention are disclosed, and in which the separate parts are designated by suitable reference characters in each of the views, and in which:

Fig. 1 is a diagrammatic perspective view of a camera which I employ.

Fig. 2 is a plan view of the central portion of the bed of the camera, omitting part of the structure shown in Fig. 1, and with parts broken away.

Fig. 3 is an enlarged broken section on the line 3—3 of Fig. 2.

Fig. 4 is a partial section on the line 4—4 of Fig. 2, on an enlarged scale.

Figs. 5 and 6 are plan views of other forms of members or elements which I employ.

Fig. 7 is a diagrammatic view of an instruction or guide sheet employed to guide the photographer in the taking of successive pictures in production of the resulting film; and Fig. 8 is a detailed view of one edge portion of two word strips which I employ, on an enlarged scale.

In the art of producing motion picture film wherein members or elements are moved relatively to each other, it has been customary to utilize transparencies upon which the member or element, which may be an object or a figure, is arranged in different positions on successive transparencies, as successive transparencies are photographed, in order to produce motion in the resulting film. Here, the word film is intended to mean a successive series of pictures constituting a film.

In illustrating one adaptation and use of my invention, I have shown it as applied to the production of what has been commonly referred to as the "bouncing-ball" movable relatively to the word script of a song to accentuate and guide in the singing of such song. One adaptation of this invention wherein transparencies, as referred to above, was used, is disclosed in Patent 1,573,696 granted February 16, 1926.

My present invention deals with the use of mechanical means rather than transparencies for positioning one member or element, such for example, as a ball, relatively to the script on a word sheet, thus eliminating the time and labor required to produce the numerous transparencies which otherwise would be required. It will thus be apparent that production of film of the type and kind under consideration can be expedited, simplified and materially economized.

In Fig. 1 of the drawing, I have shown in perspective, diagrammatically, a conventional camera arrangement, such as employed in studios for producing film of the type and kind under consideration. The camera is generally identified at 10, 11 and 11' illustrating the illuminating means for the copy holder or bed 12 of the camera. At the back of the bed 12 is a hinged glass or other transparent plate 13 which is usually swung over the objects being photographed, in taking pictures, and the operative mechanism which I employ is disposed beneath such glass or transparent member when in its lowered position.

The bed comprises a central round table portion 14, with table ends 15 and 16, and adjustable longitudinally of the tables, are two pegged slide strips 17 and 18 adjustable by cranks 19 and 20 respectively. The table 14 has backwardly and forwardly arranged and longitudinally spaced sheet guide strips 21 and 21', on the central portion of which is arranged similar and aligned scale markings 22 and 22'. Slidably mounted between the strips 21 and 21' are song word strips or sheets, as at 23 and 24, having common markings at opposed ends thereof, as more clearly illustrated in Fig. 8 of the drawing, in which one edge portion of the two strips 23 and 24 is shown, and it will appear that the strip 23 has two markings A and B, and the strip 24, markings identified by the reference characters C and D.

Disposed over the strips 23 and 24, between the strips 21 and 21' and arranged on the peg strip 17, is a masking sheet 25, which masks out everything on the strips 23 and 24, except two lines of verse, for example, the lines 26 and 27, which lines appear in the aperture 28 of the mask. It will be noted that the line 26 is on the card 23, whereas the line 27 is on the card 24. The relative movement and shifting of the card strips 23 and 24 will be later described.

Secured to the strip 18 is a plate or frame 29 which includes a transversely extending rectangular plate portion 30 and a longitudinally extending arm 31 disposed over the strip 18 and upon the latter is secured a scale strip 32 having scale markings extending longitudinally thereof for a length equal to the distance between the strips 21 and 21'. Any suitable scale markings, as diagrammatically seen at 33 may be arranged on the strip, and only part of such markings are diagrammatically shown, but they may, for example, comprise the numerals "0" to 230", to form guide markings guiding adjustment of the frame 29 relatively to the indicator mark 34 on the table 14.

Rotatably mounted in the rectangular plate 30 of the frame 29, and arranged upon the upper surface of said plate is a tooth-disc 35 having a fingerpiece or operating knob 36. The disc 35 also has a series of graduated markings, as at 37, movable relatively to an indicating point 38 on the plate 30. At one side of the plate 30 is a dove-tailed slideway 39, in which is slidably mounted a rack bar 40, which operatively engates the tooth-wheel 35, so that as the wheel 35 is rotated, the bar 40 is moved forwardly and backwardly in the groove 39.

Hinged to the bar 40, as seen at 41, is an arm 42 which is adapted to extend over and to move relatively to the word lines of the strips 23 and 24. In the present illustration, the arm or the ball member 43 carried thereby is moving relatively to the line 26 on the card 23.

The ball member or element has a key-type supporting portion 44 bevelled to seat in a bevelled socket 45 in the arm 42, as clearly seen in Fig. 4 of the drawing. In Figs. 5 and 6, I have shown other members or elements 43' and 43" mounted on supports 44' and 44", which are also insertable into the socket 45 of the arm 42. The member or element 43' shows a ball in a slightly flattened condition, whereas at 43", the ball is illustrated in an extremely flattened condition. These latter members or elements are utilized when the arm is brought in close proximity to one of the words or part of a word in line 26, so as to give the affect of flattening of the ball, as it hits or strikes the word or syllable in question. In other words, when the photographs are taken, with the arm in such positions, the member 43' will be first substituted for the member 43 and then the member 43" substituted, after which the member 43 will again be used as the ball rises from the last word or syllable.

At this time, it will be well to point out that in addition to the masking, all of the subject appearing on the table 14, between the strips 21 and 21', except for the opening 28, the arm 42 including the key mounting 44, 44' and 44" is also masked out by blacking or shading the same to a color consistent with that of the mask 25. However, the member or element 43, 43' and 43" will be of such color as to show or be readily photographed upon the masked or colored areas over which the same is travelling, so that the only thing that will appear on the resulting picture will be the two lines 26 and 27 and the member or element 43, 43' and 43" arranged thereover.

It will be understood that the hand wheels 19 and 20 have suitable gear connections with the respective rails 17 and 18 to move the same longitudinally of the camera bed. As the present invention deals primarily with the adjustment of the strip 18, diagrammatic showing of the operation of this strip is indicated in Figs. 2 and 3 of the drawing. On the shaft 46 of the wheel 20, at the rear end thereof is secured a pinion 47 which operates a gear 48 on a shaft carrying a gear or pinion 49, the latter operating upon a rack 50 on the under-surface of the strip 18, as will be apparent. By this construction, a relatively fine adjustment of the strip 18 is provided, so as to bring the markings or graduations 33 in registering alinement with the gauge mark or indicator 34 in shifting the position of the element 43 across the strips or sheets 23 and 24.

At this time, it is not important to point out specifically, any particular type of gauge markings or scales, except to note that a suitable adjustment is provided for moving the arm 42 across the photographed area of the table 14, while at the same time, adjusting the position of the member or element 43 vertically with respect to the line 26, which latter adjustment is provided by moving the knob 35 or the scale 37 thereof relatively to the indicator 38. At this time it will also be understood that after the member 43 has reached the end of the line 26, then the two cards or strips 23 and 24 are adjusted through a series of stages, bringing the markings A, B, C and D in registering positions with the scales 22 and 22' for a successive series of pictures, until the line 27 assumes the position of the line 26. During this operation, the arm 42 is adjusted to bring the ball or member 43 from the right hand side to the left hand side of the photographed area in a successive series of photographed positions, and then another card, not shown, will be placed below the card 24 and the card 23 will be removed. The next adjusted position of the cards will be the card 24, to a position similar to that occupied by the card 23 in the drawing, and the next successive card will assume a position similar to the card 24. This operation will continue until the complete verse of the song has been photographed.

As each line or verse is brought into position for singing, the ball or other member 43 is moved downwardly through a successive series of photograph stages until it strikes or hits the word "when," then passes through an upwardly and downwardly extending loop until it strikes the word "you," and so forth, until each word, or part of a word on the line has been accentuated to guide in the singing of the song. By providing the hinged mounting of the arm 42, the arm can be swung to the left to give free access to the bed or to leave this bed fully exposed for any other photography purpose.

Considering Fig. 7 of the drawing, here is shown part of an instruction or guide sheet which is used by the photographer, as a means to guide in the setting of the cards or strips 23 and 24, and so forth, as well as to guide the adjusted positions of the member or element 43 and its associated elements. On this instruction sheet or guide, we are particularly concerned with the columns dealing with the ball or element 43, which column is designated by the reference character 51, in Fig. 7, and the column 52 headed by the abbreviation "Pos." designates the position of the ball. The column 53 designates the card and the column 54 the position of the card. On the instruction card or sheet, line 55 shows positions 10 and 110, position 10 identifying the scale marking of the disc 35 registering with the indicator 38, and position 110 indicating the registration of the scale 33 with the indicator 34. Under the heading "Card," or in other words, column 53, and the column 54, there will be no change, for the reason that cards one and two will assume a position where B on card one registers with characters 10 on the scales 22 and 22', and this position is maintained for a long series of pictures, or until the card 23 is raised and the card 24 moved to bring the line 27 in position corresponding to line 26.

When this change takes place, suitable instructions will appear in the columns 53 and 54, reference being made to the characters A, B, C, and D on the cards or similar characters as appearing on successive cards that may be used. Attention is also directed to lines 56 and 57, in which lines the numeral one appears, which means that the ball or member 43 is photographed two successive times in the same position. However, in these positions, the numbers 43' and 43" will be used, as this is the position in which the ball theoretically strikes or bounces on the word or phrase. For purposes of description, the strips 17, 18, the strips 21, 21', frame 29, arm 31 and associated parts may be said to comprise an indexing means for the strips or sheets 23, 24 and positioning of the ball member 43 thereon.

Having fully described my invention, what I claim as new and desire to secure by Letters Patent is:

1. In cameras of the class described, a copy holder bed, indexing means for adjustably guiding characterized cards over said bed, means for masking said cards, means adjustably supporting a member on said bed for movement relatively to characterizations on said cards in several directions over the full width of said cards vertically and horizontally with respect to said characterizations, said last named means comprising an arm, means including a scale guiding positioning of said arm longitudinally with respect to said characterizations, and other means for guiding adjustment of the arm vertically with respect to said characterizations.

2. In cameras of the class described, a copy holder bed, indexing means for adjustably guiding characterized cards over said bed, means for masking said cards, means adjustably supporting a member on said bed for movement relatively to characterizations on said cards in several directions over the full width of said cards vertically and horizontally with respect to said characterizations, said last named means comprising an arm, means including a scale guiding positioning of said arm longitudinally with respect to said characterizations, other means for guiding adjustment of the arm vertically with respect to said characterizations, and means pivotally mounting said arm to swing toward and from said bed.

3. In a camera of the class described, a copy holder bed having an area to be photographed, an elongated masked-out member mounted for movement over said area, means on said member for supporting an element to be photographed, a slide movable longitudinally of the bed, means for actuating the slide, said slide including a frame extending transversely of the bed, said member being mounted on a rack bar slidably engaging the frame, in a direction at right angles to movement of the slide on the bed, and means adjustably supported on the frame operatively engaging said rack to adjust the position of said member.

4. In a camera of the class described, a copy holder bed having an area to be photographed, an elongated masked-out member mounted for movement over said area, means on said member for supporting an element to be photographed, a slide movable longitudinally of the bed, means for actuating the slide, said slide including a frame extending transversely of the bed, said member being mounted on a rack bar slidably engaging the frame, in a direction at right angles to movement of the slide on the bed, means adjustably supported on the frame operatively engaging said rack to adjust the position of said member, and said last named means and the slide having scales for guiding adjustment of the slide and rack.

SEYMOUR KNEITEL.

REFERENCES CITED

The following references are of record in the file of this patent:

UNITED STATES PATENTS

| Number | Name | Date |
|---|---|---|
| 898,692 | Shepard | Sept. 15, 1908 |
| 1,377,394 | Byck | May 10, 1921 |
| 1,525,037 | Loventhal | Feb. 3, 1925 |
| 1,650,132 | Jones | Nov. 22, 1927 |
| 1,723,910 | Aramburn | Aug. 6, 1929 |